(12) United States Patent
Laughlin

(10) Patent No.: US 9,102,563 B2
(45) Date of Patent: Aug. 11, 2015

(54) ENVIRONMENTALLY RUGGED FREE-SPACE FIBER WAVEGUIDE CONNECTOR AND METHOD OF MANUFACTURE THEREOF

(75) Inventor: Richard H. Laughlin, Tyler, TX (US)

(73) Assignee: Greg S. Laughlin, Cedar Park, TX (US)

( * ) Notice: Subject to any disclaimer, the term of this patent is extended or adjusted under 35 U.S.C. 154(b) by 1615 days.

(21) Appl. No.: 12/628,595

(22) Filed: Dec. 1, 2009

(65) Prior Publication Data

US 2011/0091156 A1   Apr. 21, 2011

Related U.S. Application Data

(60) Provisional application No. 61/252,090, filed on Oct. 15, 2009.

(51) Int. Cl.
| | |
|---|---|
| *G02B 6/32* | (2006.01) |
| *C03C 8/02* | (2006.01) |
| *C03C 27/06* | (2006.01) |

(52) U.S. Cl.
CPC . *C03C 8/02* (2013.01); *C03C 27/06* (2013.01); *G02B 6/32* (2013.01); *G02B 6/327* (2013.01)

(58) Field of Classification Search
None
See application file for complete search history.

(56) References Cited

U.S. PATENT DOCUMENTS

| | | | |
|---|---|---|---|
| 4,509,827 A | | 4/1985 | Cowen et al. |
| 4,545,643 A | * | 10/1985 | Young et al. ............. 385/78 |
| 4,637,683 A | | 1/1987 | Asawa |
| 4,961,985 A | | 10/1990 | Henn et al. |
| 5,809,193 A | | 9/1998 | Takahashi |
| 6,168,319 B1 | * | 1/2001 | Francis ................. 385/79 |
| 6,540,411 B1 | | 4/2003 | Cheng |
| 6,597,837 B2 | * | 7/2003 | Xiaofan ................ 385/33 |
| 6,888,652 B2 | * | 5/2005 | Miyake et al. ........ 359/223.1 |
| 6,978,065 B2 | * | 12/2005 | Liu et al. .............. 385/33 |
| 2002/0131699 A1 | * | 9/2002 | Raguin et al. .......... 385/33 |
| 2003/0063832 A1 | * | 4/2003 | Hellman et al. ........ 385/11 |
| 2003/0095748 A1 | * | 5/2003 | Lee et al. ............. 385/34 |
| 2009/0231665 A1 | * | 9/2009 | Takei et al. ........... 359/280 |

* cited by examiner

*Primary Examiner* — Hemang Sanghavi

(57) ABSTRACT

Various embodiments of free-space fiber waveguide connectors, feed-throughs and GRIN lens assemblies and methods of bonding GRIN lenses in, and aligning waveguide fibers to, such connectors, feed-throughs and assemblies. In one embodiment, a free-space fiber waveguide connector includes: (1) an insert having a waveguide fiber bonded in a fiber mount attached proximate one end of the insert and an angle-faced GRIN lens attached proximate an opposing end of the insert and (2) a lens collar attached to the GRIN lens, the one end defining a reference plane and a virtual axis of the GRIN lens perpendicular to the reference plane, the fiber mount adjustable to a reflection from a reflective surface bonded parallel to the reference plane.

29 Claims, 8 Drawing Sheets

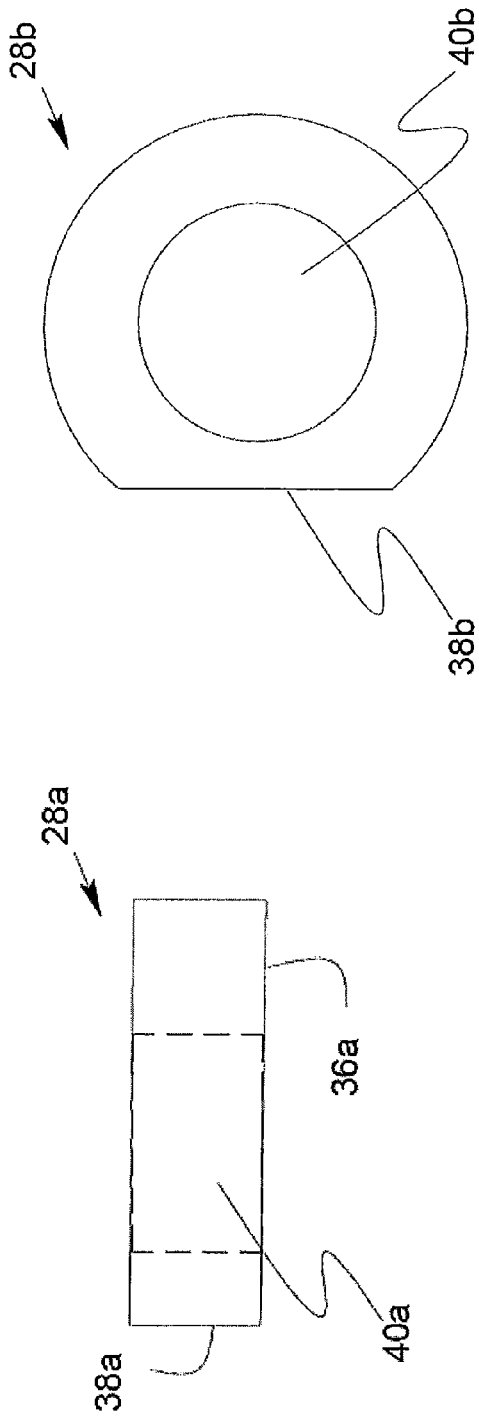
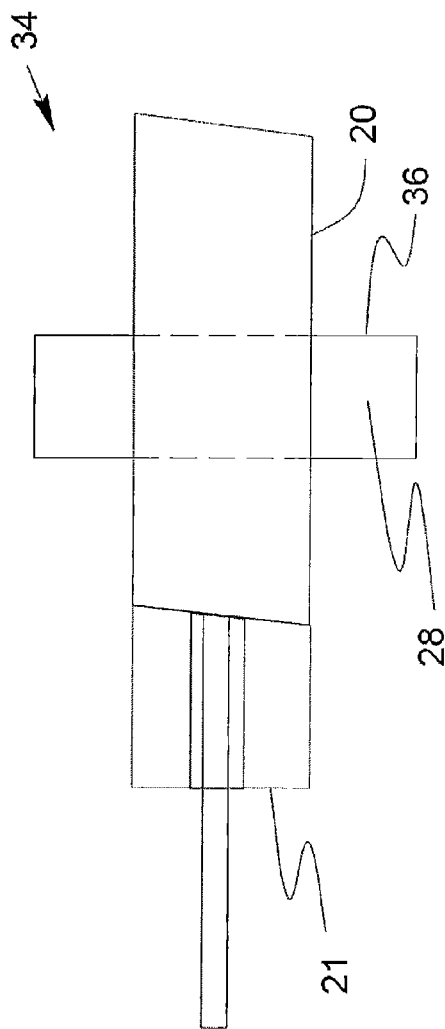
Fig. 3A
Fig. 3B
Fig. 4

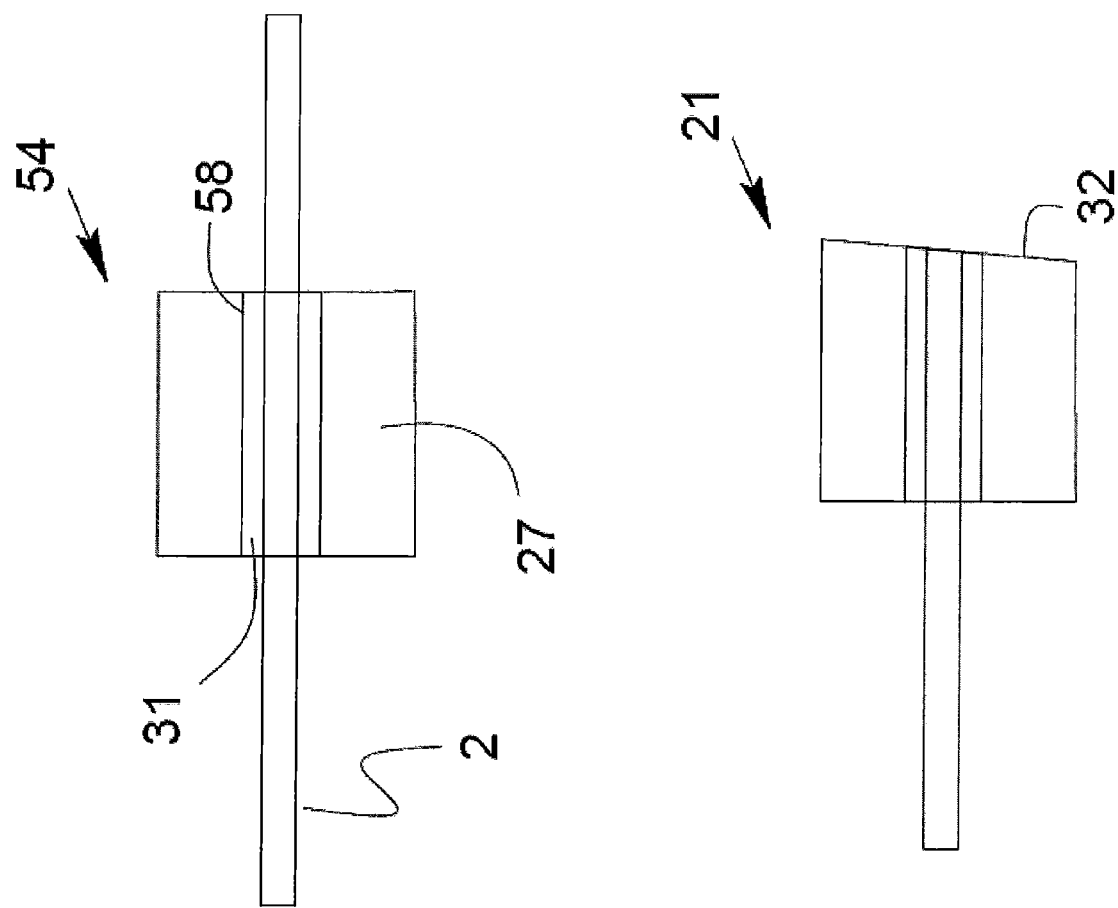

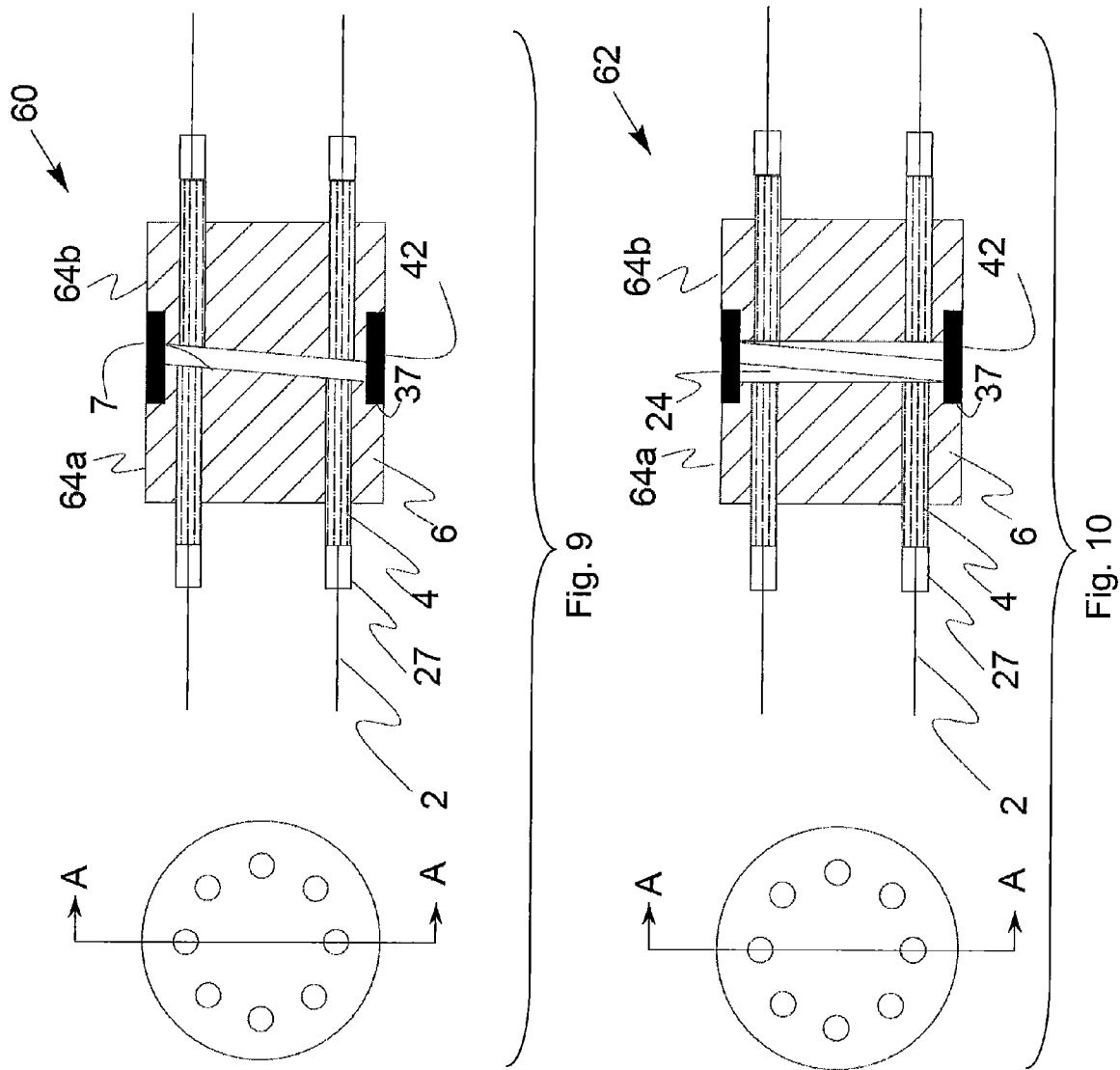

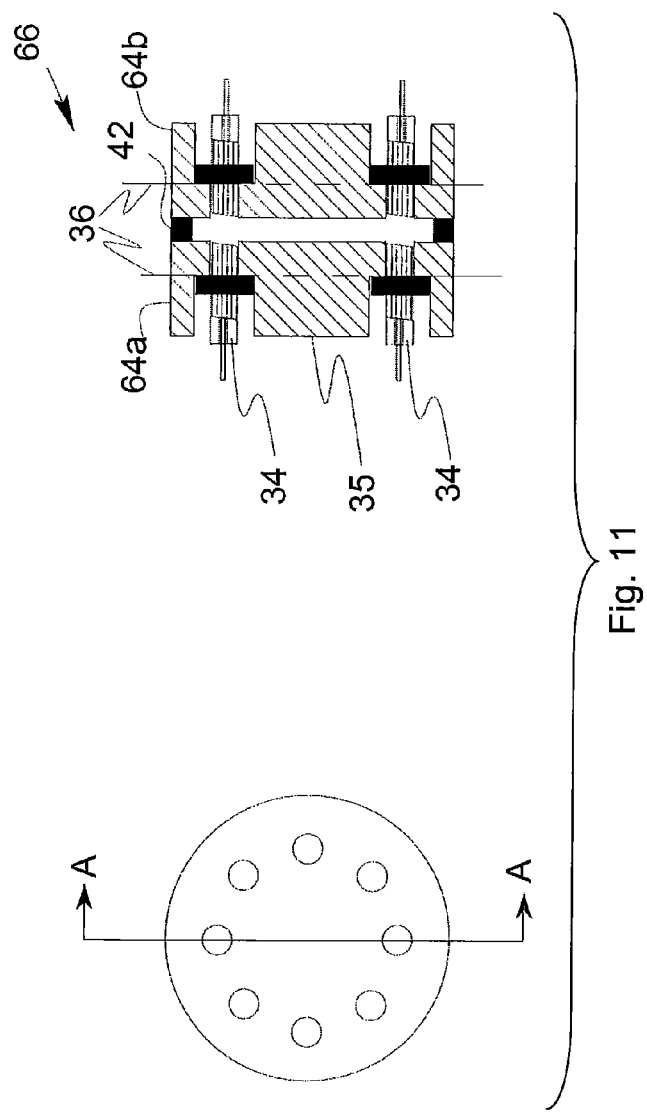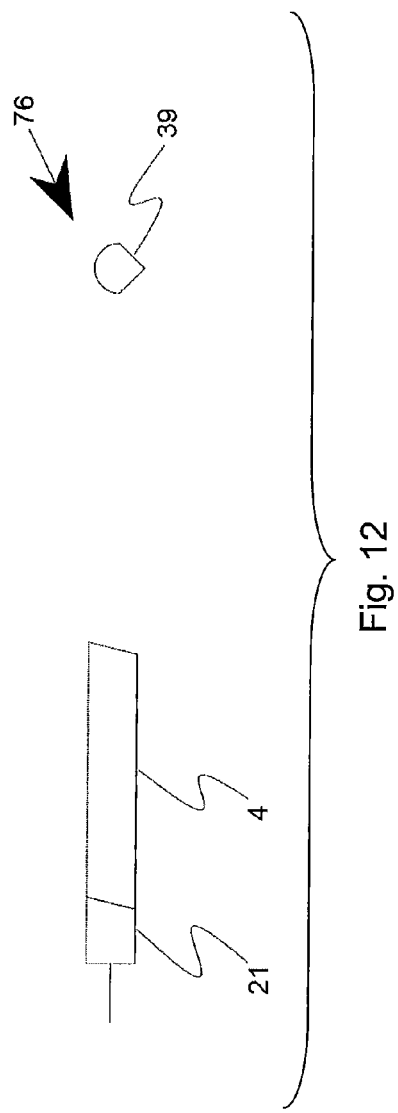

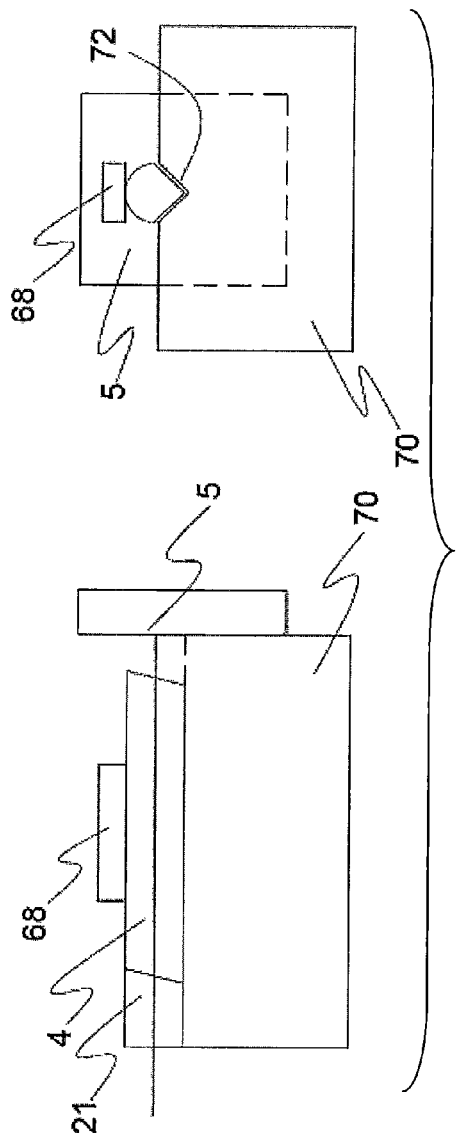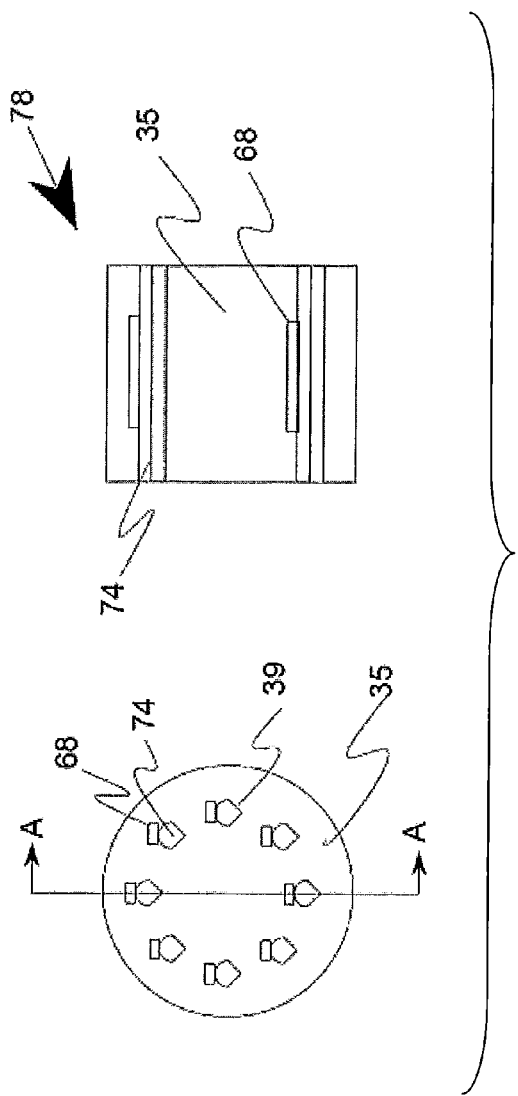

ENVIRONMENTALLY RUGGED FREE-SPACE FIBER WAVEGUIDE CONNECTOR AND METHOD OF MANUFACTURE THEREOF

CROSS-REFERENCE TO RELATED APPLICATION

This application claims the benefit of U.S. Provisional Application Ser. No. 61/252,090, filed by Laughlin on Oct. 15, 2009, entitled "Environmentally Rugged Free-Space Fiber Waveguide Connector and Method of Manufacture Thereof," commonly assigned with this application and incorporated herein by reference.

TECHNICAL FIELD

This application is directed, in general, to connectors for optical fiber waveguides and optical component coupling, and more particularly, to free-space fiber waveguide connectors and methods of aligning single-mode and multi-mode optical fiber waveguides using graded refractive index (GRIN) lenses.

BACKGROUND

The need for optical fiber waveguide connectors in optical fiber waveguide communication systems and other applications has long been apparent. Ideally, connectors should present only a minimal loss in the fiber waveguide transmission medium. There are two basic types of connectors: the fiber waveguide to fiber waveguide connector, and the collimated beam free-space connector. Fiber-to-fiber waveguide connectors are the simplest and least expensive; however, they are extremely sensitive to misalignment. To keep losses below a tenth of a decibel (0.1 dB) in a typical single mode fiber-to-fiber waveguide connector, the gap between the fibers and any lateral misalignment must be kept below two microns. Most fiber-to-fiber waveguide connectors in the past have depended on axial alignment of the components in the connector to minimize loss. Typical of these are ferrule-type connectors, which produce the best tolerances. Typical losses for the best of these connectors, single mode, are 0.2 dB mean and 0.3 dB at three standard deviations. A significant problem with these connectors is the contact. Since it is virtually impossible to maintain spacing on the order of one micron, the common practice is to butt the fiber waveguides to one another. However, since such connectors are often deployed in a high vibration environment, such as an aircraft, they tend to degrade over time as a result of vibration-induced spalling of the ends of the fibers.

One of the solutions to this issue is the free-space collimated connector. Although any lens can be used in such connectors, ball and GRIN lenses are most often used to form a collimated beam. Collimating a beam amounts to trading spatial sensitivity for angular sensitivity. For example, to maintain a 0.2 dB insertion loss, the optical axis of a two millimeter focal length lens must be aligned to within three minutes of arc for a single-mode fiber waveguide.

The majority of collimated lens connectors align the fiber waveguide to the outside diameter of the lens and the inside diameter of the ferrule. In other words, the outside radii of the fiber waveguide is referenced to the outside radii of the lens; this radially-referenced axis is then used to align the halves together. Unfortunately, this alignment technique requires great precision, otherwise significant losses can result. The most important aspect is controlling the tolerances on the GRIN lens, including both the diameter and angle of its face.

Another aspect is aligning the mechanical center of the fiber waveguide precisely with the mechanical center of the lens. Failure to do so can result in significant insertion loss 0.75 to 1.5 dB and variation in the insertion loss.

SUMMARY

One aspect provides a free-space fiber waveguide connector. In one embodiment, the connector includes: (1) an insert having a waveguide fiber bonded in a fiber mount attached proximate one end of the insert and an angle-faced GRIN lens attached proximate an opposing end of the insert and (2) a lens collar attached to the GRIN lens, the one end defining a reference plane and a virtual axis of the GRIN lens perpendicular to the reference plane, the fiber mount adjustable to a reflection from a reflective surface bonded parallel to the reference plane.

Another aspect provides a free-space fiber waveguide connector. In one embodiment, the connector includes: (1) a first connector-half including: (1a) a transparent body attached to a planar face of a lens holder, the holder defining a reference plane, and (1b) a GRIN lens bounded in the lens holder having a fiber mount at the opposing end of the GRIN lens, the fiber mount adjustable to a virtual axis defined by a reflective surface perpendicular to the virtual axis and (2) a second connector-half including: (2a) a free-space connector having a lens axis alignment and spacing corresponding to the first connector-half.

Yet another aspect provides a free-space fiber waveguide connector. In one embodiment, the connector includes: (1) a first connector-half including: (1a) a lens holder defining a reference plane and having a face at a nonzero angle with respect thereto and (1b) a GRIN lens bonded in the lens holder and having an adjacent face parallel to the face of the lens holder and a fiber mount at an opposing end thereof, the fiber mount adjustable to a virtual axis defined by a reflective surface perpendicular to the virtual axis and (2) a second connector-half including: (2a) a free-space connector having a lens axis alignment and spacing corresponding to the first connector-half.

Still another aspect provides a free-space fiber waveguide connector. In one embodiment, the connector includes: (1) a first connector-half including: (1a) an insert mount that defines a reference plane and (1b) an insert having a waveguide fiber bonded in a fiber mount attached proximate one end of the insert and an angle-faced GRIN lens attached proximate an opposing end of the insert and (2) a second connector-half including: (2a) a free-space connector having a lens axis alignment and spacing corresponding to the first connector-half.

Still yet another aspect provides a free-space fiber waveguide connector. In one embodiment, the connector includes a waveguide fiber mount including a fiber holder, a fiber waveguide, and a bonding agent bonding the fiber waveguide to the fiber holder, a coefficient of expansion of the fiber holder nominally matching a coefficient of expansion of the fiber waveguide and also nominally matching a coefficient of expansion of the bonding agent, the fiber waveguide having a surface oriented at a nonzero angle with respect to an axis of the fiber.

Another aspect provides a free-space feed-through. In one embodiment, the connector includes: (1) a fiber holder, (2) a waveguide fiber and (3) a glass frit hermetic seal securing the waveguide fiber within the fiber holder, a coefficient of expansion of the fiber holder nominally matching a coefficient of expansion of the fiber waveguide and also nominally matching a coefficient of expansion of the glass frit.

Yet another aspect provides a method of bonding a GRIN lens. In one embodiment, the method includes: (1) polishing a surface of the GRIN lens and a surface of another material, (2) placing the surfaces adjacent one another and (3) applying a substantial electric field across the surfaces to place the surfaces into opposite ionic states.

Still another aspect provides a method of aligning a fiber to a virtual axis of a GRIN lens. In one embodiment, the method includes: (1) bonding the GRIN lens to a beveled, transparent plate, the plate defining a reference plane perpendicular to the virtual axis, (2) placing a reference reflector parallel to the reference plane, (3) injecting a signal into the fiber, (4) adjusting a position of the fiber until at least a near-maximum reflected signal is achieved and (5) bonding the fiber at the position.

Still yet another aspect provides a GRIN lens assembly. In one embodiment, the assembly includes: (1) a GRIN lens having a bevel on an output face thereof, (2) a fiber mount located on an opposing end of the GRIN lens and providing longitudinal and angular references and (3) a waveguide fiber bonded to the fiber mount in an orientation that is perpendicular to the longitudinal reference.

BRIEF DESCRIPTION

Reference is now made to the following descriptions taken in conjunction with the accompanying drawings, in which:

FIGS. 1A-D illustrate various embodiments of techniques for achieving an angled GRIN lens;

FIGS. 3A and 3B illustrate side and end views of an embodiment of a lens collar;

FIG. 4 illustrates an embodiment of a collimating insert assembly;

FIG. 7 illustrates an embodiment of the bonding of a fiber waveguide to a fiber waveguide holder;

FIG. 8 illustrates an embodiment of a fiber waveguide feed-through to a fiber waveguide mount;

FIG. 9 illustrates end and side views of an embodiment of a fiber waveguide connector;

FIG. 10 illustrates end and side views of an embodiment of a fiber waveguide connector with a transparent plate;

FIG. 11 illustrates end and side views of an embodiment of a connector with removable inserts;

FIG. 12 illustrates side and end views of an embodiment of a linear GRIN lens assembly;

FIG. 13 illustrates side and end views of an embodiment of an alignment method for a linear GRIN lens assembly; and FIG. 14 illustrates end and side views of an embodiment of a fiber connector with a linear GRIN lens assembly.

DETAILED DESCRIPTION

Figure 1A:
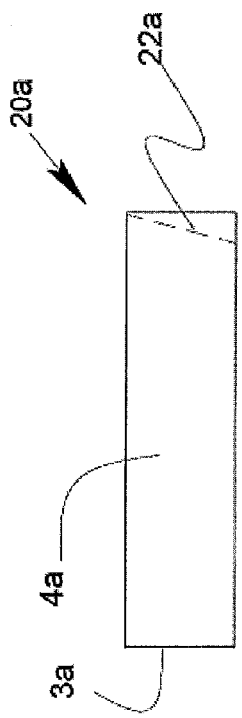

As stated above, the majority of collimated lens connectors align the fiber waveguide to the outside diameter of the lens and the inside diameter of the ferrule, which requires great precision, otherwise significant losses can result.

U.S. Pat. No. 4,637,683, issued to Asawa, recognizes the challenge inherent in achieving this level of precision and teaches an alternative technique in which a reference plane is ground at the end of a fiber waveguide array of a connector half. Asawa uses a reflective coating proximate the reference plane to facilitate the alignment of the fiber waveguide to the optical axis which was perpendicular to the reference plane. While this arrangement addresses the issue of optical insertion loss as a function of alignment, it fails to address pre-alignment and assembly of individual fiber waveguides or replacement and repair of individual fiber waveguides. Specifically, when the reflective coating is removed the reference plane now becomes the end of the GRIN lens. This introduces two problems. The first is that while the GRIN lenses must remain in contact to maintain alignment, vibration and other movement occurring over time causes a degradation of the interface between the two lenses and an increase in both loss and back reflection. The second is the significant back reflection caused if a gap is induced between the two output ends of the GRIN lenses and the gap has an index of refraction that differs from that of the GRIN lenses.

Asawa also teaches a connector in which a plurality of fiber waveguides and a lens are aligned to form one half of a connector. A common lens holder contains the half, and the lens holder and the lens are ground to make a coplanar surface. Unfortunately, the individual fiber waveguides cannot be individually assembled and or repaired. In addition the lens surface can not be ground such that back-reflections are reduced or substantially eliminated.

U.S. Pat. No. 4,509,827, issued to Cowen, et al., teaches a similar alignment technique. Cowen uses a "master reference rod" in a precision bore bushing to adjust the mirror, to find the center of the bore and replaces the "master reference rod" with the actual GRIN lens and adjust it to the reference mirror. This teaching also has limitations. One must change lenses, which is a significant step in a manufacturing operation. There is no reference plane apart from the inside bore. The most significant limitation is the tolerance. In order to work over some reasonable temperature range and to allow the insertion and removal of GRIN lenses. There must be some tolerance greater than several microns. This amount of misalignment will cause a significant insertion loss, greater than 0.3 dB.

U.S. Pat. No. 6,540,411, issued to Cheng, teaches an optical coupling having an optical fiber waveguide inserted into a fiber waveguide tube, which is mounted in a first sleeve. A GRIN lens is mounted in a second sleeve. The first sleeve is adjusted at abutting ends thereof with a second sleeve to produce a maximum coupling. One of the Cheng's limitations is the required gap between the fiber waveguide and the lens which results in Fresnel loss and back reflection.

U.S. Pat. No. 5,809,193, issued to Takakhasi, teaches an angled surface at the fiber waveguide GRIN lens interface, to prevent back reflections. However Takakhasi relies on mechanical tolerances for the alignment of the fiber waveguide core to the optical axis. In addition, Takakhasi does not address the reflections at the opposing, output, end of the GRIN lens.

U.S. Pat. No. 4,691,985, issued to Shank, teaches a lens body for a connector in which the lens is connected to the fiber waveguide body. Unfortunately Shank fails to teach a reference plane; alignment is by mechanical tolerance.

For one reason or another, all of the above-described connectors fall short of providing connectivity that is not only suitable for demanding applications but also that remains reliable under conditions in which connectors are now likely to be deployed. More specifically, modern connectors are required to operate as follows: they should be able to stand up to high shock (as in shipboard applications) and high vibration (as in aircraft applications) with a insertion loss of 0.75 dB standard, 0.5 dB enhanced and a 0.2 dB goal; and a return loss (back reflection) of −30 dB standard, −40 dB enhanced and a −60 dB goal. There is also, in some cases, to withstand high temperatures (about 200° C.) while maintaining a hermetic seal. In addition each fiber waveguide must be capable of individual assembly and repair.

Recently a new requirement has been encountered, that being fiber waveguide feed-throughs and fiber waveguide mounts that do not materially outgas or materially cause stress fractures. Initially epoxy was used as a bonding agent in fiber waveguide feed-throughs and fiber waveguide mounts. Epoxy has two limitations. The first was that it could not stand extreme temperatures. In addition, when applied to hermetically sealed packages it has been found to outgas, contaminating the seal. In response to these shortcomings, a technique of metalizing the fiber waveguide and soldering it into the assembly was developed. Over time it was discovered that this technique resulted in stress fractures when the fiber waveguides were cycled through high temperatures. Today's requirements therefore frequently call for a high temperature, hermetically sealed, "connectorized" fiber waveguide feed-through.

A quarter-pitch GRIN lens functions as a collimating lens. The refractive index of the lens material varies radially in such a manner as to expand a very small source of light, emerging from a single-mode fiber waveguide, into a much broader, parallel beam. If a second quarter-pitch GRIN lens is placed adjacent to, and axially aligned with, the first one, the parallel beam is focused down to almost a point focus, for launching into a single-mode fiber waveguide in the second connector half. This approach has the advantage of greatly reducing the requirements for lateral alignment of the fiber waveguides, i.e., the required tolerance for lateral fiber waveguide alignment is greater. However, the use of connector lenses requires extreme precision of angular alignment. For a connector loss of 0.1 dB, the angular alignment tolerance is 0.0003 radians, or approximately one minute of arc ($\frac{1}{60}^{th}$ of a degree). Therefore, the GRIN lens connector approach trades dimensional alignment tolerance for angular alignment tolerance, giving rise to a need for an accurate and convenient method of angular alignment of the connector lenses.

One cannot rely on precision manufacture of the GRIN lenses, since not all such lenses are perfect plane cylinders, and losses or partial wastage will inevitably result. In the past, techniques for assuring precision in the connector halves have relied on there being a near-perfect "master" parallel beam, generated either from a perfect connector half or from a separate source. The procedure typically used is to align and orient each manufactured connector half with the parallel beam. This may not always be possible for some lens components, and can still lead to wastage. The fiber waveguide is then positioned and attached to the lens. In theory, any two connector halves that have been matched to the master parallel beam will be perfectly matched to each other. Unfortunately, these prior-art techniques do not reliably work in practice. A new approach is needed for angular alignment of GRIN lens connector halves.

Reference will now be made to FIGUREs wherein like structures will be provided with like reference designations. It is to be understood that the drawings are diagrammatic and schematic representations of certain embodiments of the invention, and are not to be construed as limiting the invention, nor are the drawings necessarily drawn to scale.

FIG. 1A shows an angled face GRIN lens 20a. A conventional GRIN lens 4a is shaped, ground or cleaved in various embodiments to produce a beveled face 22a. To reduce the back reflection due to Fresnel reflections at the GRIN lens air interface, an angle, nominally about 8°, is introduced into the output face of the GRIN lens 4.

Figure 1B:
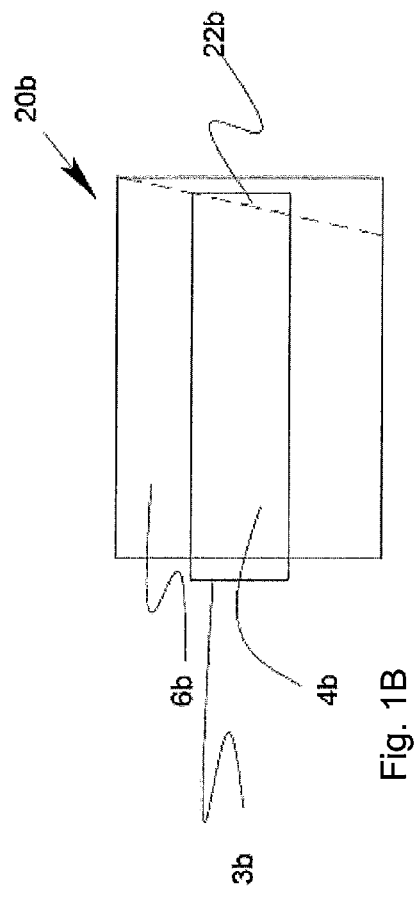

FIG. 1B illustrates a GRIN lens 4b in a lens holder 6b. The lens holder 6b can hold a single lens 4b or a plurality of lenses 4b (1 . . . n). After the one or more lenses 4b are secured in place, an angled bevel 22b is formed, ground or polished in various embodiments. In one embodiment, the bevel 22b is between 3° and 8°, depending upon the differential in the index of refraction at the beveled surface.

Figure 1C:
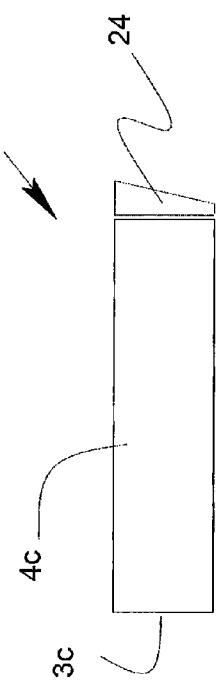

FIG. 1C illustrates another embodiment of the angled face GRIN lens 20c. Attached to the face opposing the focal plane 3 is a transparent wedged cylinder 24. In one embodiment the index of refraction, of the wedged cylinder 24 nominally matches the index of refraction of the GRIN lens. This reduces, minimizes or perhaps totally eliminates Fresnel reflections. The Fresnel reflections from the wedge cylinder 24 air interface are now directed at such an angle that they are focused at a point, on the focal plane 3 such that they are displaced from the input point on the focal plane 3. The index of refraction of the transparent wedge should match the index of refraction of the GRIN lens to with in 3.46% to keep the Fresnel reflection at the interface to less than −35 dB and 0.25% to maintain the reflection at less than −55 dB.

Figure 1D:
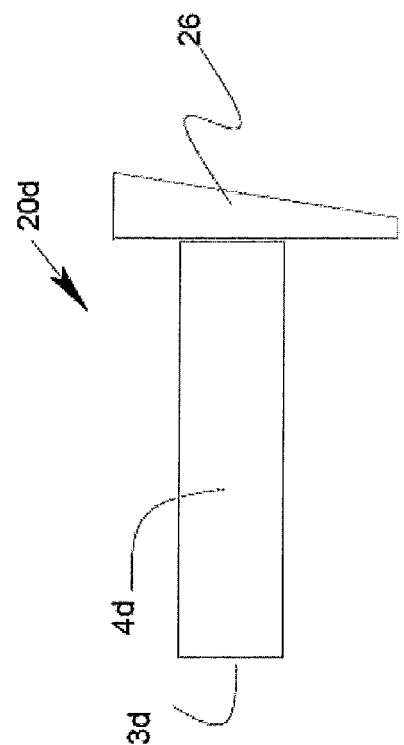

FIG. 1D shows an angled face GRIN lens 20d where the beveled transparent plate 26 is larger than the GRIN lens. Those skilled in the pertinent art will recognize that the beveled transparent plate 26 can be any shape. In two example alternative embodiments, it is a cuboid or a cylinder with one or more GRIN lenses 4c attached.

Figure 2B:
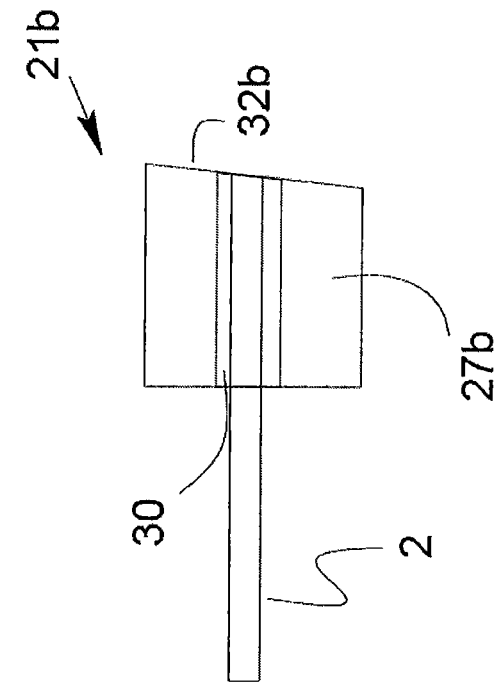
FIGS. 2A and 2B illustrate an embodiment of a fiber waveguide mount and an embodiment of a technique for achieving the mount.
Figure 2A:
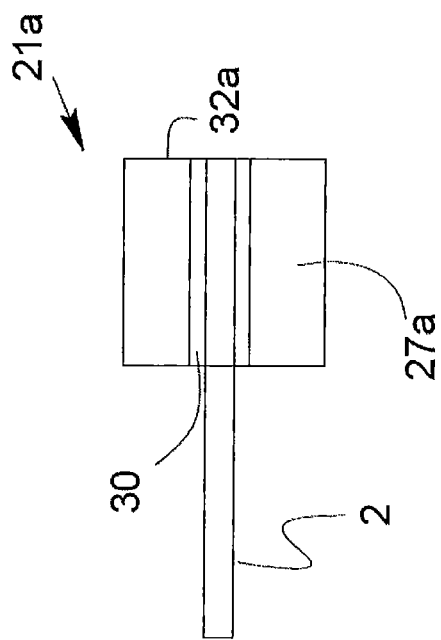

FIG. 2A illustrates a planar fiber waveguide mount 21a, with a surface 32a perpendicular to the fiber waveguide axis to less than 0.03 rad. for a 0.1 dB loss, or 0.06 rad. for a 0.5 dB loss, incurred as a result than a less-than-perfect alignment. In one embodiment the fiber waveguide holder 27a is made of glass with substantially the same coefficient of expansion (see, FIG. 10) as that of the fiber waveguide. One skilled in the pertinent art will recognize that the differing coefficients of expansion can cause stress fractures in the fiber waveguide when the assembly is exposed to wide temperature ranges. The fiber waveguide holder 27a can be formed from tubing, machined solid glass, molded ceramic or other suitable materials and processes. The fiber waveguide 2 is inserted into the fiber waveguide holder and bonded to the fiber waveguide holder with a bonding agent 30. In one embodiment, the bonding agent is an epoxy. In another, it is a cement. In still another, it is a glass frit.

FIG. 2B illustrates a beveled fiber waveguide mount 21b, with a beveled surface 32b at some angle to the plane perpendicular to the fiber waveguide axis. In one embodiment the angle is 3° to 8°, depending on the differential in the index of refraction between the fiber waveguide and the GRIN lens.

FIGS. 3A and 3B show the lens collar 28a, 28b, respectively. The lens collar has an inner diameter 40 such that the angle face GRIN lens 20 can be inserted into the lens collar 28 and bonded. The lens collar 28a, 28b has an angular reference 38 delineated for alignment purposes. In the illustrated embodiment, this angular reference a flat included in the lens collar 28a, 28b. Those skilled in the pertinent art will recognize that there are a multitude of techniques that can be used to delineate the angular position, including pins and keys.

FIG. 4 illustrates a collimating insert 34 assembly, for a free-space fiber waveguide connector. The assembly consist of a fiber waveguide mount 21 bonded to an angled face GRIN lens 20. The angle-faced GRIN lens 20 is inserted and bonded into the lens collar 28. The lens collar 28 facilitates the mounting of the collimating insert 34 assembly into various devices. In one embodiment, the angle-faced GRIN lens 20 is inserted into a free-space optical connector. The surface 36 of the lens collar 28 defines a reference plane and the optical axis of the collimating insert 34 assembly.

Figure 5:
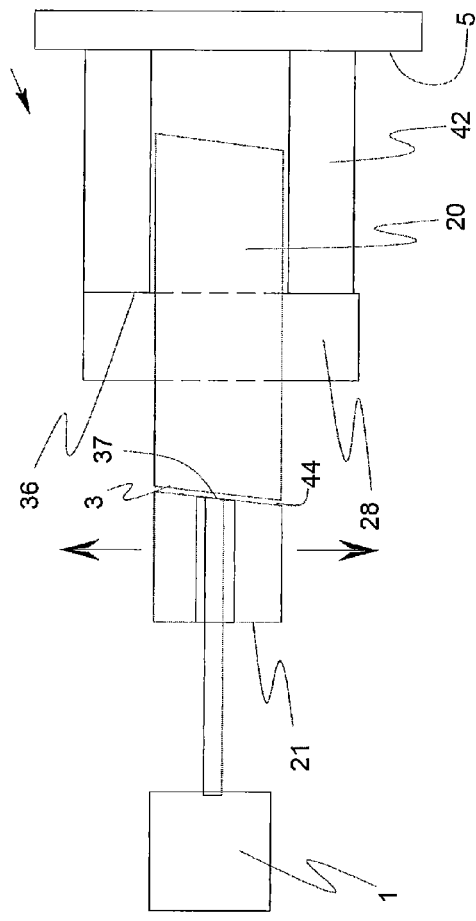
FIG. 5 illustrates an embodiment of an alignment technique for the collimating insert assembly of FIG. 4.

FIG. 5 illustrates one embodiment of an alignment method for the collimating insert 34 assembly. The collimating insert 34 is temporarily, placed in a calibrated spacer 42. The calibrated spacer 42 positions the reflective surface 5 parallel to the reference plane 36, of the collimating insert 34. The fiber waveguide mount 21 is spaced with a gap 44, between the fiber waveguide holder reference plane 37 and the focal plane 3 of the GRIN lens 4. An optical beam is injected into the fiber waveguide 2 from the reflectometer 1. This signal is transmitted through the fiber waveguide 2 into the angled GRIN lens 20. The angled GRIN lens 2 collimates the beam, and it is reflected from the reflective surface 5 back into the GRIN lens 4 which focuses it on the focal plane 3 of the GRIN lens 4. The fiber waveguide mount 21 is adjusted parallel to the insert reference plane 36 for a maximum signal. Those skilled in the pertinent art will recognize this as an autocollimation process. When the collimated optical beam is aligned perpendicular to the reflective surface, and thus the insert reference plane, the fiber waveguide mount 21 is translated along the axis, perpendicular to the insert reference plane 36 and bonded. The collimating insert is then removed from the calibrated spacer 42. The bonding can be accomplished by a variety of means. In one embodiment it is accomplished by electrostatic or ionic bonding.

Figure 6:
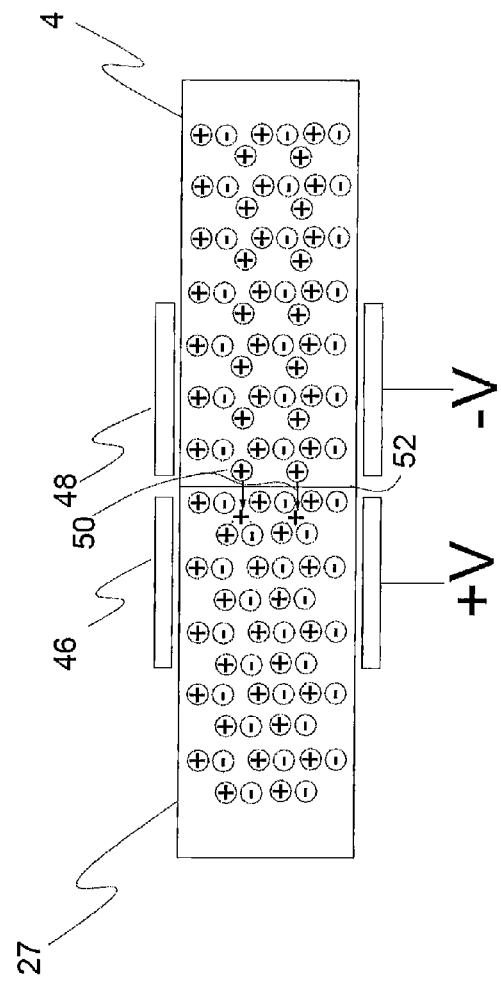
FIG. 6 illustrates an embodiment of a bonding of a GRIN lens to a fiber waveguide mount.

FIG. 6 shows electrostatic bonding or ionic boding of a GRIN lens to a glass surface. The properties of the GRIN lens 4 are effected by diffusion of ions into a molten glass. Those skilled in the art will recognize that various ions, such as Na(+), Li(+) and Ag(+), may be used to dope the glass to alter its index of refraction. The implantation of these ions provides the excess ions, in the GRIN lens material that facilitate the electrostatic or ionic bond 52. A cylinder of glass, such as the fiber waveguide holder 27 is polished and is brought into contact with a material with excess ions, such as a GRIN lens 4, that has a polished surface. Upon contact, the Van der Waals forces provide a relatively weak bond. A positive electrode 46 and a negative electrode 48 are placed around the two cylinders, and a voltage is applied. In one embodiment, this voltage varies between 1000 and 2000 volts. The applied field resulting from this voltage, across the interface between the fiber waveguide holder 27 and the GRIN lens 4 causes some of the electrons, from the positive ions to migrate 50 from the GRIN lens 4 into the fiber waveguide holder 27, thus producing an electrostatic bond. Those skilled in the pertinent art will recognize that this technique may also be used to bond the GRIN lens 4 to the wedge 24 and 26.

FIG. 7 illustrates the bonding of the fiber waveguide to the fiber waveguide holder 27. A fiber waveguide mount material 56 is selected such that it matches the coefficient of expansion of the fiber waveguide such that over the temperature pressure excursions the stress resulting from the differential between the coefficient of expansion of the waveguide fiber 2 and the fiber holder 27 and the bonding agent 30 the stress induced does not exceed one-third of the proof stress $P_s$. The proof stress of a typical fiber is about 100,000 psi. In one embodiment this is a glass tube with the inside bore 58 slightly larger than the outside diameter of the cladding of the fiber waveguide to be mounted. One skilled in the pertinent art understands that the fiber waveguide mount material 56 can take on many forms, including but not limited to: a glass block that is drilled or bored, a piece of ceramic that is drilled or bored, a molded glass or a molded ceramic.

A fiber waveguide 2 is inserted in the inside bore 58 of the fiber waveguide mount material 56. A glass frit 31 is placed in the space between the fiber waveguide 2 and the inside wall of the bore 58. The glass frit 31 is selected such that its coefficient of expansion nominally matches the coefficient of expansion of the glass fiber waveguide.

The fiber waveguide feed-through 54a assembly is then heated to the melting temperature of the frit 31, nominally 180° C. to 300° C. Those skilled in the pertinent art will recognized that this can be accomplished in an oven, by induction heating or by many other techniques.

FIG. 8 illustrates converting a fiber waveguide feed-through 54 to a fiber waveguide mount 21. The fiber waveguide feed-through 54, is shaped with a planar surface 32 at some angle from the plane perpendicular to the fiber waveguide axis. In one embodiment the shaping is accomplished by polishing, and one angle is about 8°. The angle is a function of the: acceptable back reflection, index of refraction of the fiber waveguide and the index of refraction of the opposing media into which the fiber is radiating.

FIG. 9 illustrates a connector array 60. A plurality of GRIN lens 4 are mounted in a lens holder 6 and shaped to form a ground face 7 at some predefined angle, nominally 6° to 8°, to the fiber waveguide holder reference plane 37. As FIG. 4 shows, the fiber waveguide holder 27 is positioned to align the fiber waveguide 2 from a reflective surface 5 (not shown) that is parallel to the reference plane 37. The two halves of the connector 64a 64b along with a precision spacer 7 are assembled to form a free-space connector array 60. One skilled in the pertinent art will recognize that the lens holder 6 can take on any one of a number of shapes. In one embodiment, it is a truncated cylinder. In another embodiment, it is an extruded cuboid. In various alternative embodiments, multiple GRIN lenses 4 are arranged in circular, linear and staggered arrays.

FIG. 10 illustrates another embodiment of a connector array 62. In the embodiment of FIG. 10, a transparent plate 26 or a transparent cylinder 24 is attached to a planar face of the lens holder 6, which is nominally parallel to the reference plane 37, lens holder 6. As FIG. 7 shows, the fiber waveguide holder 27 is positioned to align the fiber waveguide 2 from a reflective surface 5 (not shown) that is parallel to the reference plane 37. The two halves of the connector 64a, 64b, along with a precision spacer 42, are assembled to form a free-space connector array 62. One skilled in the pertinent art will recognize that the lens holder 6 can take on any of a plurality of alternative shapes. In one embodiment it is a truncated cylinder. In another embodiment it is an extruded cuboid. The GRIN lens 4 may be inserted in a circle, a linear array or a staggered array.

FIG. 11 illustrates a connector 66 with inserts. With the fiber waveguide 2 aligned to the reference plane 36a, one or more of collimating insert(s) 34, are inserted into the insert mount 35a and 35b. The insert mount can take on a plurality of shapes. It is circular in one embodiment. However a cuboid or irregular shape will perform the same function. The two connector halves 64a and 64b, containing the insert 34 and the insert mount 35, are mated together with a calibrated spacer 42, such that the two reference planes 36 are nominally parallel to one another. Those skilled in the pertinent art will recognize that additional registration in the rotational axes to align the optical axis of each lens. Alignment may be achieved by many structures, such as flats, pins or keys. In addition, the two connector halves 64a and 64b may also employ rotational registration in addition to X, Y registration. In one embodiment, a common (to free-space connectors) connector housing (not shown) is used to accomplish this function.

FIG. 12 illustrates a linear GRIN lens assembly 76. The liner GRIN lens assembly 76 includes GRIN lens 4 with and bevel 22 on its output face and a fiber mount 21 bonded on the opposing end. The GRIN lens assembly 74 is shaped to provide a longitudinal reference and an angular reference. In one embodiment this shaping is a pair of flat surfaces 39 ground at some angle to one another and parallel to the virtual axis of the assembly.

FIG. 13 illustrates an alignment method for the GRIN lens assembly 76. The GRIN lens assembly 76 is placed in the alignment base 70. A alignment plunger 68 forces the GRIN lens assembly 76 firmly into the alignment key 72, referencing the GRIN lens assembly 76 both longitudinally and angularly. A reflective surface 5 is placed in a plane perpendicular to the planes of the alignment key 72. The fiber mount 21 is adjusted for maximum return, aligning the waveguide fiber 2 to the virtual axis of the GRIN lens assembly 76. The fiber mount 21 is then bonded to the GRIN lens 4. In one embodiment this is electrostatic bonding.

FIG. 14 illustrates a free-space linear inserts, fiber connector 78, with GRIN lens assemblies 74, with reference parallel to a virtual axis. The first half of the connector 64 is composed of a insert holder 35, that is formed with an alignment key 72 and an alignment plunger 68, to register the GRIN lens assembly 74 that is placed in the insert holder 35. The insert holder 35 has a reference plane reference plane 39 that is perpendicular to the alignment key 72 plane(s).

One skilled in the pertinent art will recognize that there may be a single or a plurality of alignment surfaces and that these surfaces can be formed at various angles. The alignment plunger 64 is a detent spring in one embodiment, but takes on alternative forms in alternative embodiments.

Those skilled in the pertinent art to which this application relates will appreciate that other and further additions, deletions, substitutions and modifications may be made to the described embodiments.

What is claimed is:

1. A free-space fiber waveguide connector, comprising:
an insert having a waveguide fiber bonded in a fiber mount attached proximate one end of said insert and an angle-faced GRIN lens attached proximate an opposing end of said insert; and
a lens collar attached to said GRIN lens, said one end defining a reference plane and a virtual axis of said GRIN lens perpendicular to said reference plane, said fiber mount adjustable to a reflection from a reflective surface parallel to said reference plane;
a spacer assembly coupled with said lens collar, said spacer assembly for positioning said reflective surface parallel to said reference plane.

2. The connector as recited in claim 1 wherein said lens collar also defines an angular reference.

3. The connector as recited in claim 1 wherein said lens collar is a cylinder and said angular reference is a flat surface on said cylinder.

4. The connector as recited in claim 1 wherein said fiber mount coefficient of expansion is identical to said fiber.

5. The connector as recited in claim 1 wherein frit bonds said fiber in said fiber mount.

6. The connector as recited in claim 1 wherein frit attaches said lens collar to said GRIN lens.

7. The connector as recited in claim 1 wherein electrostatic bonding bonds said fiber mount into position.

8. A free-space fiber waveguide connector, comprising:
a first connector-half including:
a transparent body attached to a planar face of a lens holder, said holder defining a reference plane, and
a GRIN lens bounded in said lens holder having a fiber mount at said opposing end of said GRIN lens, said fiber mount adjustable to a virtual axis defined by a reflective surface perpendicular to said virtual axis;
a spacer assembly coupled with said lens holder, said spacer assembly for positioning said reflective surface parallel to said reference plane; and
a second connector-half including:
a free-space connector having a lens axis alignment and spacing corresponding to said first connector-half.

9. The connector as recited in claim 8 wherein said transparent body is composed of glass.

10. The connector as recited in claim 8 wherein said transparent body is a cylinder.

11. The connector as recited in claim 8 wherein said transparent body is a cuboid.

12. The connector as recited in claim 8 wherein electrostatic bonding bonds said fiber mount to said GRIN lens.

13. The connector as recited in claim 8 wherein electrostatic bonding bonds said lens holder to said transparent plate.

14. The connector as recited in claim 8 wherein glass frit bonds said GRIN lens to said lens holder.

15. The connector as recited in claim 8 wherein said second connector-half has a structure identical to said first connector-half.

16. The connector as recited in claim 8 wherein a precision spacer aligns reference planes of said first and second connector-halves.

17. The connector as recited in claim 8 wherein said lens holder contains a plurality of GRIN lens assemblies.

18. The connector as recited in claim 8 wherein said lens holder contains a single GRIN lens assembly.

19. A free-space fiber waveguide connector, comprising:
a first connector-half including:
a lens holder defining a reference plane and having a face at a nonzero angle with respect thereto, and
a GRIN lens bonded in said lens holder and having an adjacent face parallel to said face of said lens holder and a fiber mount at an opposing end thereof, said fiber mount adjustable to a virtual axis defined by a reflective surface perpendicular to said virtual axis;
a spacer assembly coupled with said lens holder, said spacer assembly for positioning said reflective surface parallel to said reference plane; and
a second connector-half including:
a free-space connector having a lens axis alignment and spacing corresponding to said first connector-half.

20. The connector as recited in claim 19 wherein electrostatic bonding bonds said fiber mount to said GRIN lens.

21. The connector as recited in claim 19 wherein glass frit bonds said GRIN lens to said lens holder.

22. The connector as recited in claim 19 wherein said second connector-half has a structure identical to said first connector-half.

23. The connector as recited in claim 19 wherein a precision spacer aligns reference planes of said first and second connector-halves.

24. The connector as recited in claim 19 wherein said lens holder contains a plurality of GRIN lens assemblies.

25. The connector as recited in claim 19 wherein said lens holder contains a single GRIN lens assembly.

26. A free-space fiber waveguide connector, comprising:
a first connector-half including:
an insert mount that defines a reference plane, and
an insert having a waveguide fiber bonded in a fiber mount attached proximate one end of said insert and an angle-faced GRIN lens attached proximate an opposing end of said insert;

a spacer assembly coupled with said insert, wherein said fiber mount is adjustable to a virtual axis defined by a reflective surface perpendicular to said virtual axis, wherein said reflective surface is positioned parallel to said reference plane by said spacer assembly; and a second connector-half including:

a free-space connector having a lens axis alignment and spacing corresponding to said first connector-half.

27. The connector as recited in claim 26 wherein said second connector-half has a structure identical to said first connector-half.

28. The connector as recited in claim 26 wherein a precision spacer aligns reference planes of said first and second connector-halves.

29. The connector as recited in claim 26 wherein said insert further includes a lens collar, one side of said lens collar defining a reference plane and a virtual axis of said GRIN lens perpendicular to said reference plane, said fiber mount adjustable to a reflection from a reflective surface parallel to said reference plane and bonded in that position.

* * * * *